(12) United States Patent
Golovashkin et al.

(10) Patent No.: US 11,615,309 B2
(45) Date of Patent: Mar. 28, 2023

(54) FORMING AN ARTIFICIAL NEURAL NETWORK BY GENERATING AND FORMING OF TUNNELS

(71) Applicant: Oracle International Corporation, Redwood Shores, CA (US)

(72) Inventors: Dmitry Golovashkin, Morrisville, NC (US); Uladzislau Sharanhovich, San Jose, CA (US); Brian Vosburgh, Durham, NC (US); Denis B. Mukhin, Burlington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 1034 days.

(21) Appl. No.: 16/287,492

(22) Filed: Feb. 27, 2019

(65) Prior Publication Data

US 2020/0272904 A1    Aug. 27, 2020

(51) Int. Cl.

| | | |
|---|---|---|
| G06F 40/279 | (2020.01) | |
| G10L 15/16 | (2006.01) | |
| G06N 3/082 | (2023.01) | |
| G06F 17/11 | (2006.01) | |
| G06N 3/04 | (2023.01) | |

(52) U.S. Cl.
CPC ............. *G06N 3/082* (2013.01); *G06F 17/11* (2013.01); *G06N 3/04* (2013.01)

(58) Field of Classification Search
CPC ........ G06N 3/082; G06N 3/04; G06N 3/0445; G06N 3/088; G06N 3/0454; G06N 3/084; G06F 17/11
See application file for complete search history.

(56) References Cited

U.S. PATENT DOCUMENTS

| | | |
|---|---|---|
| 5,649,066 A | 7/1997 | Lacher |
| 5,950,191 A | 9/1999 | Schwartz |
| 6,826,668 B1 | 11/2004 | Hsu et al. |
| 7,028,023 B2 | 4/2006 | Wang |
| 7,143,091 B2 | 11/2006 | Charnock et al. |
| 8,332,333 B2 | 12/2012 | Agarwal et al. |
| 9,730,643 B2 | 8/2017 | Georgescu et al. |
| 9,767,410 B1* | 9/2017 | Guevara ................. G10L 15/16 |
| 2002/0059154 A1* | 5/2002 | Rodvold ................ G06N 3/086 706/26 |
| 2004/0059695 A1 | 3/2004 | Xiao et al. |

(Continued)

OTHER PUBLICATIONS

Satu Elisa Schaeffer, "Graph clustering", Computer Science Review I (2007) 27-64, 38 pages.

(Continued)

*Primary Examiner* — Brandon S Cole
(74) *Attorney, Agent, or Firm* — Hickman Becker Bingham Ledesma LLP

(57) ABSTRACT

In an artificial neural network, integrality refers to the degree to which a neuron generates, for a given set of inputs, outputs that are near the border of the output range of a neuron. From each neural network of a pool of trained neural networks, a group of neurons with a higher integrality is selected to form a neural network tunnel ("tunnel"). The tunnel must include all input neurons and output neurons from the neural network, and some of the hidden neurons. Tunnels generated from each neural network in a pool are merged to form another neural network. The new network may then be trained.

20 Claims, 9 Drawing Sheets

(56) References Cited

U.S. PATENT DOCUMENTS

| | | | |
|---|---|---|---|
| 2005/0038533 | A1 | 2/2005 | Farrell |
| 2006/0206872 | A1 | 9/2006 | Krishnaswamy |
| 2010/0060643 | A1 | 3/2010 | Kolipaka |
| 2012/0158628 | A1 | 6/2012 | Junker |
| 2012/0203583 | A1 | 8/2012 | Junker |
| 2012/0317142 | A1 | 12/2012 | Broecheler |
| 2013/0159231 | A1 | 6/2013 | Modha |
| 2014/0143280 | A1 | 5/2014 | Duan et al. |
| 2014/0143329 | A1 | 5/2014 | Garg |
| 2014/0279306 | A1 | 9/2014 | Shi et al. |
| 2015/0178410 | A1 | 6/2015 | Carter et al. |
| 2015/0373049 | A1 | 12/2015 | Sharma et al. |
| 2016/0155049 | A1 | 6/2016 | Choi |
| 2016/0328643 | A1 | 11/2016 | Liu |
| 2017/0046614 | A1 | 2/2017 | Golovashkin |
| 2017/0337472 | A1* | 11/2017 | Durdanovic ............ G06N 3/082 |
| 2018/0048620 | A1 | 2/2018 | Inoue et al. |
| 2018/0144352 | A1 | 5/2018 | Ram et al. |
| 2018/0174025 | A1* | 6/2018 | Jin ...................... G06N 3/0481 |
| 2019/0378017 | A1* | 12/2019 | Kung ..................... G06N 3/084 |
| 2020/0327309 | A1* | 10/2020 | Cheng .................. G06V 40/165 |

OTHER PUBLICATIONS

Bishop, Christopher, "Exact Calculation of the Hessian Matrix for the Multi-layer Perceptron", Published in Neural Computation 4 No. 4 dated (1992) 494-501, 8pgs.

Burke et al., "Limited Memory BFGS Updating in a Trust-Region Framework" This research was supported by National Science Foundation Grant, dated Apr. 1, 2008, 11 pages.

Byrd et al., "A Stochastic Quasi-Newton Method for Large Scale Optimization", dated 2015, 31 pgs.

Coppola et al., "lbfgs: Efficient L-BFGS and OWL-QN Optimization in R", dated 2014, 15pgs.

Ganguli, Surya, "Fast Large Scale Optimization by Unifying Stochastic Gradient and Quasi-Newton Methods", dated 2014.

Batson et al., "Spectral Sparsification of Graphs: Theory and Algorithms", Communications of the ACM, vol. 56, No. 8, Aug. 2013, 8 pages.

Nicol N. Schraudolph, "Fast Curvature Matrix-Vector Products for Second-Order Gradient Descent", Neural Computation 14, 1723-1738, dated (2002), 16 pages.

Terry et al., "Edge Detection Using Neural Networks", dated 1993, 5pgs.

Satuluri et al., "Local Graph Sparsification for Scalable Clustering", SIGMOD' 11, Jun. 12-16, 2011, 12 pages.

Schmidt et al., "Learning Graphical Model Structure Using Ll-Regularization Paths", dated 2007, 6pgs.

Schmidt, Mark, Graphical Model Structure Learning with l1 Regularization, dated 2010, 175pgs.

Schmidt, Mark, "Learning Recurrent Neural Networks with Hessian-Free Optimization", dated 2011, 8pgs.

Seidl, Robert, "Preconditioning for Hessian Free Optimization" dated 2012.

Sohl-Dickstein et al., Fast Large-Scale Optimization by Unifying Stochastic Gradient and Quasi-Newton Methods, dated 2014.

M. E. J. Newman, "The Structure and Function of Complex Networks", Society for Industrial and Applied Mathematics, vol. 45, No. 2, 2003, 90 pages.

\* cited by examiner

Observations 202

| IN(0,1) | IN(0,2) |
|---|---|
| 1 | 1 |
| 0 | 0 |
| 2 | -2 |
| -2 | -2 |

Outputs 204

| G(2,1) | G(2,2) | G(2,3) | G(2,4) |
|---|---|---|---|
| .7 | 1 | .003 | .9 |
| 1 | 1 | 0 | .6 |
| .3 | .01 | .999 | .1 |
| .8 | .9 | 1 | .7 |

Integrality Measure Values 212
Inverse Integrality Measure Values 214

| .556 | .901 | .996 | .526 |
|---|---|---|---|
| .8 | .11 | .004 | .9 |

FIG. 2

FORMING AN ARTIFICIAL NEURAL NETWORK BY GENERATING AND FORMING OF TUNNELS

FIELD OF THE INVENTION

The present invention relates to neural networks.

BACKGROUND

An artificial neural network ("neural network) belongs to a class of models that are built to predict unknown data. An neural network is based on systems of interconnected neurons or nodes. A neural network may contain three kinds of layers and three kinds of neurons, which depend on the layer in which a neuron is in. An input layer comprises input neurons and a hidden layer comprises hidden neurons. Each input layer provides output to a hidden layer, each input neuron in the input layer supplying a single output to one or more hidden neurons in the hidden layer.

The output layer comprises output neurons. The output layer takes input from a single hidden layer, each output neuron in the output layer taking a single input from each of one or more hidden neurons in the hidden layer. The output layer supplies the output of the neural network, each output neuron in the output providing an output for the model.

Each hidden neuron and output neuron applies an activation to the combination of the inputs supplied to the neuron, each input being adjusted by a weight. The combination of weighted input may then may be adjusted by a bias.

The predictive accuracy of a neural network is important. For example, in fraud detection applications a mere one percent increase in accuracy can result in remarkable savings. The speed at which a neural network can process an input to generate an output is also of paramount importance. Faster neural networks lessen training time and/or require fewer computer resources to train. Faster neural networks also enable the use of fewer computer resources to generate a larger number of predictions from a larger volume of inputs. For example, in fraud detection application, faster neural networks allow fraud detection for a larger number of transactions with fewer computer resources.

A neural network model can be incorporated as a scoring engine in robotics or biomedical applications, and be used as a scoring engine for long periods of time (months or years); needless to say that higher accuracy models can, in the long run, produce substantial savings.

Described herein are approaches for creating neural networks with greater predicative accuracy that can be executed more quickly and/or using less computing resources. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 illustrates integrality and inverse integrality measure values generated for a set of input and output according to an embodiment.

DETAILED DESCRIPTION

In the following description, for the purposes of explanation, numerous specific details are set forth in order to provide a thorough understanding of the present invention. It will be apparent, however, that the present invention may be practiced without these specific details.

General Overview

Techniques are described for creating neural networks that have greater predicative accuracy and that can be executed more quickly and/or executed using less computing resources. Central to these techniques are integrality and measures of integrality. Integrality refers to the degree to which a neuron generates, for a given set of inputs, outputs that are near the border of the output range of a neuron. Inputs to a neural network may be referred to herein as observations.

For example, a neuron based on a sigmoid activation function has a range of output from 0 to 1. A neuron that tends to produce outputs near 0 or 1 for a given set of observations has a high integrality while a neuron that tends to produce values around 0.5 has a very low integrality. As another example, a neuron based on a hyperbolic tangent activation function has a range of output from −1 to 1. A neuron that tends to produce outputs near −1 or 1 for a given set of observations has a high integrality while a neuron that tends to produce values around 0 has a very low integrality.

Within a neural network, neurons with high integrality have been found to contribute to the predictive accuracy of the neural network more than neurons with low integrality. Neural networks comprising higher integrality neurons may comprise less neurons to achieve a desired predictive accuracy require less time and computing resources to train and execute.

According to an embodiment, from each neural network of a pool of trained neural networks, a group of neurons with a higher integrality is selected to form a neural network tunnel ("tunnel"). The tunnel must include all input neurons and output neurons from the neural network, and some of the hidden neurons. Tunnels generated from each neural network in a pool are merged to form another neural network. The new neural network may then be trained.

Neural Network Nomenclature

Techniques described herein apply to feed-forward networks that conform to two types of topologies. One topology is the layered topology, where the hidden groups are organized into layers. Another topology is Directed Acyclic Graph (DAG) topology, which does not have any specific layered structure.

Figure 1A:
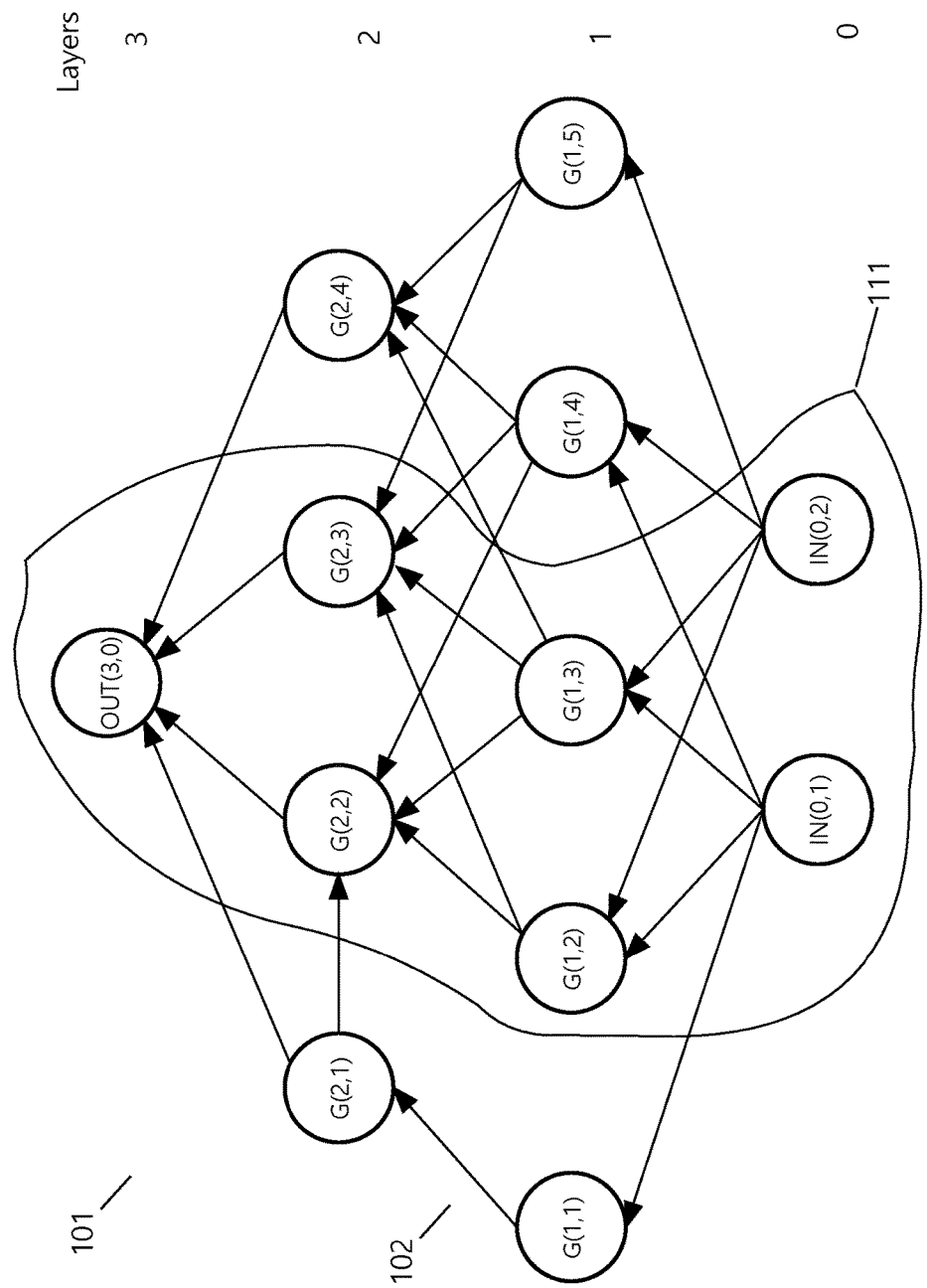
FIG. 1A depicts an artificial neural network and a tunnel of neurons according to an embodiment.

FIG. 1 is a diagram of an exemplary neural network layered feed-forward network used to introduce a notation for referring to neurons in a layered network. Referring to FIG. 1, it depicts neural network 101, which has a layered topology. Neural network 101 comprises an input layer 0, hidden layer 1, hidden layer 2, and output layer 3.

Each G(L,N) is a neuron in a hidden layer L that contains N neurons. Neural network 101 contains a group of hidden neurons G(1,1) through G(1,5) in hidden layer 1, and a group of hidden neurons G(2,1)-G(2,4) in hidden layer 2. IN(0,N) is a group of N input neurons in input layer 0. Neural network 101 includes two input neurons IN(0,1) and IN(0,2). OUT(3,N) is a group of N neurons in output layer 3. Neural network 101 includes one output neuron OUT(3, 0).

A directed edge in neural network 101 to a "target" neuron represents an input from the "source" neuron from which the edge originates. An edge is referred to herein by the edge's source neuron and target neuron. Thus, edge 102 may be referred to as edge G(1,1)-G(2,1).

The output of a source neuron that is an input for a target neuron is modified by a weight. A directed edge between the source and the target neuron that represents an output of the source neuron is associated with a weight that modifies the output. The weights associated with the edges are not depicted in FIG. 1A.

Each neuron in a hidden layer and output layer is associated with a bias. The biases are not depicted.

The neurons of neural network 101 form a directed acyclic graph. As the term is used herein with respect to a group of neurons in a neural network, a directed acyclic graph means for each input neuron in the group there is an acyclic path to at least one output neuron, and each neuron in the hidden layer of the group is included in at least one path from an input neuron to an output of the group.

A neural network tunnel ("tunnel") for a layered neural network comprises a directed acyclic graph that begins with the input neurons of the neural network and ends with the output neurons, and that includes, for each hidden layer, a proper subset of the neurons in the hidden layer. All directed edges in the tunnel exist in the neural network and retain the same weights. Group of neurons 111 comprises a tunnel which is depicted in FIG. 1B.

Figure 1B:
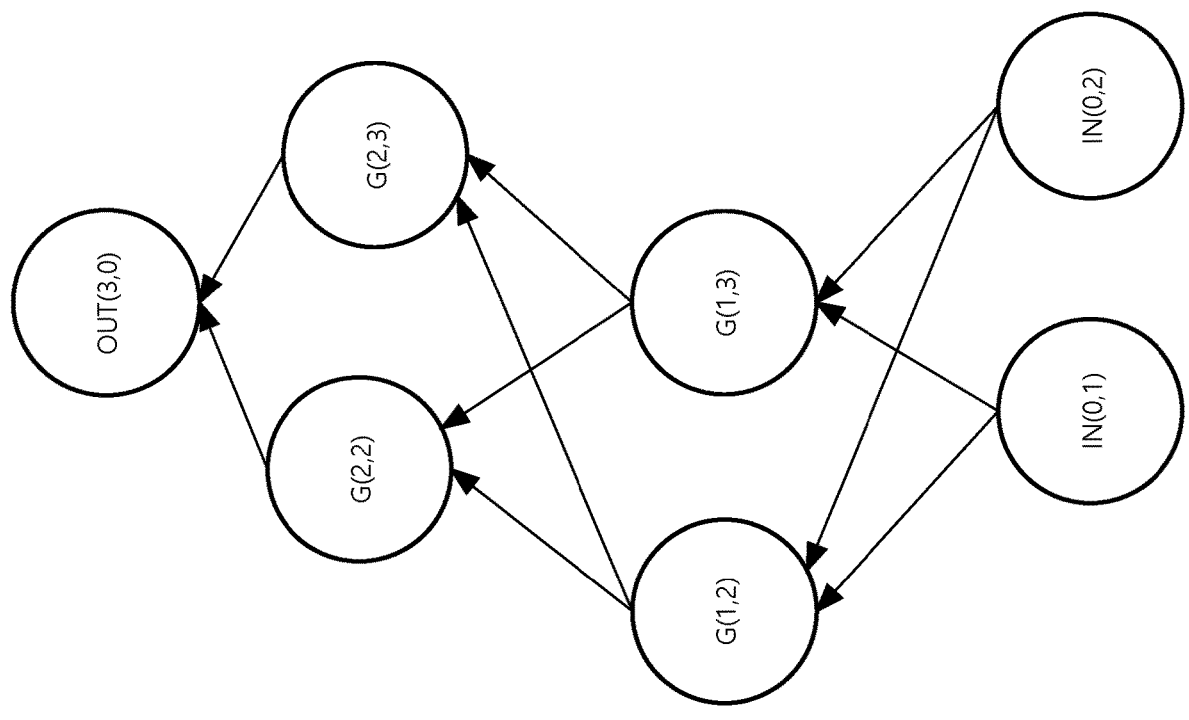
FIG. 1B depicts an artificial neural network and a tunnel of neurons according to an embodiment.

Referring to FIG. 1B, it depicts tunnel 151. Tunnel 151 includes all the neurons from group of neurons 111 in neural network 101, the group including IN(0,1), IN(0,2), G(1,2) and G(1,3) from hidden layer 1, G(2,2) and G(2,3) from hidden layer 2, and OUT(3,0). These neurons form a directed acyclic graph. Each edge in tunnel 151 retains the weight with which the edge was associated within neural network 101.

A property of a tunnel is its diameter D. D is the number of neurons in each of the hidden layers. D may be a single value that applies to all layers in the tunnel, or D may be a composite value including a possibly different value for each layer. For tunnel 151, D=2 or D =[2,2]. For purposes of exposition, D is assumed to be a single value for a given tunnel.

Measures of Integrality

Integrality of a neuron in a network may be measured in different ways depending, at least in part, on the type of activation function associated with the hidden neurons and output neurons.

For a neural network having a logical sigmoid activation, integrality can be calculated according to the following formula.

$$INT = 1 / \left(1 + \sum_{n=1}^{N} \min(|Y(n)|, |1 - Y(n)|)\right)$$ Formula I1 where Y(n) is $n^{th}$ output of N outputs for a group of one or more hidden neurons or a group of one more output neurons. The summation is taken over all outputs for N observations. The function min is the minimum function.

FIG. 2 includes a table of observations that is applied as input to neural network 101 and a table of resultant output of hidden neurons in hidden layer 2. The illustration is based on the activation function for neural network 101 being a logical sigmoid function.

Referring to FIG. 2, it depicts observations 202 for IN(0,1) and IN(0,2) and outputs 204 of each neuron G(2, N) in hidden layer 2. For the second observation [0,0] in observations 202, the outputs of G(2, 1), G(2,2), G(2,3), and G(2,4) are respectively [1,1,0,0.6].

Integrality measures 212 show the measure of integrality values calculated for each neuron G(2,N) according to Formula I1. The measure of integrality values for G(2, 1), G(2,2), G(2,3), and G(2,4) are respectively [0.556, 0.901, 0.996, 0.526].

The above Formula I1 is a measure for a logical sigmoid function with a range [0,1]. A general formula for a measure of integrality for any bounded activation function with range [L, U] may be generalized as follows.

$$INT = 1 / \left(1 + \sum_{n=1}^{N} \min(|Y(n) - L|, |U - Y(n)|)\right)$$ Formula I2

Accordingly, a formula for integrality measures for a bipolar sigmoid function and tangent activation function is as follows.

$$INT = 1 / \left(1 + \sum_{n=1}^{N} \min(|Y(n) + 1|, |1 - Y(n)|)\right)$$ Formula I3

Tunnel Extraction

Tunnel extraction is the discovery of a tunnel in a neural network that contributes to predictive accuracy more than any of other tunnels that exists in a neural network. According to an embodiment, a factor that is used to determine whether a tunnel contributes to predictive accuracy more is integrality. Thus, tunnel extraction entails measuring the integrality of groups of neurons. The determination or discovery of a tunnel deemed to contribute more to predicative accuracy than other tunnels in the neural network may be referred to herein as extracting the tunnel from the neural network.

To more efficiently determine and compare the integrality of the group of neurons in a neural network, an inverse integrality may be used. A measure of inverse integrality can be calculated according to the following formula, wherein INVINT is an inverse integrality measure.

$$INVINT = \sum_{n=1}^{N} \min(|Y(n) - L|, |U - Y(n)|) \quad \text{Formula INV}$$

The greater the integrality for one or more neurons, the smaller the inverse integrality. Thus, a goal of tunnel extraction is discovery of a tunnel with the lowest inverse integrality over all the hidden neurons in the tunnel, or a tunnel with relatively lower inverse integrality.

FIG. 2 shows inverse integrality values 214 calculated for neural network 101 based on observations 202. The inverse integrality values calculated for G(2, 1), G(2, 2), G(2, 3), G(2, 4) are respectively [0.8, 0.11, 0.004, 0.9]. G(2, 2) and G(2, 3) have the lowest inverse integrality values and thus have the highest integrality.

Layered Tunnel Extraction

Depending on the number of layers of a neural network and the number of neurons in each layer, performing tunnel extraction to find the tunnel with the absolute best integrality can be computationally expensive if not prohibitive. According to an embodiment, a procedure for tunnel extraction referred to herein as the "layered tunnel extraction" may be used that is much less computationally expensive and yet yields a tunnel with relatively higher integrity.

The layered tunnel extraction approach produces a tunnel having of diameter D. D is an input to the tunnel extraction procedure. The procedure evaluates each hidden layer in a neural network in order from the input layer to the output layer. In each iteration, a respective layer being evaluated is in effect pruned of lower integrality neurons. The group of D members having the lowest inverse integrality measure is selected for the tunnel. "Pruned" neurons, which are not in the group, are in effect removed from the neural network. Edges directed to or from the pruned neurons are also removed. Edges of the neurons in the selected group are preserved. The group of neurons preserved in an iteration are referred to herein as a tunnel subgroup.

Pruning neurons in a given layer may leave neurons in the subsequent layer unconnected to a source neuron in the tunnel subgroup of the given layer. These neurons are referred to herein as unconnected neurons. When the subsequent layer is evaluated, any unconnected neurons are not considered for the tunnel subgroup and are in effect pre-pruned.

Figure 3:
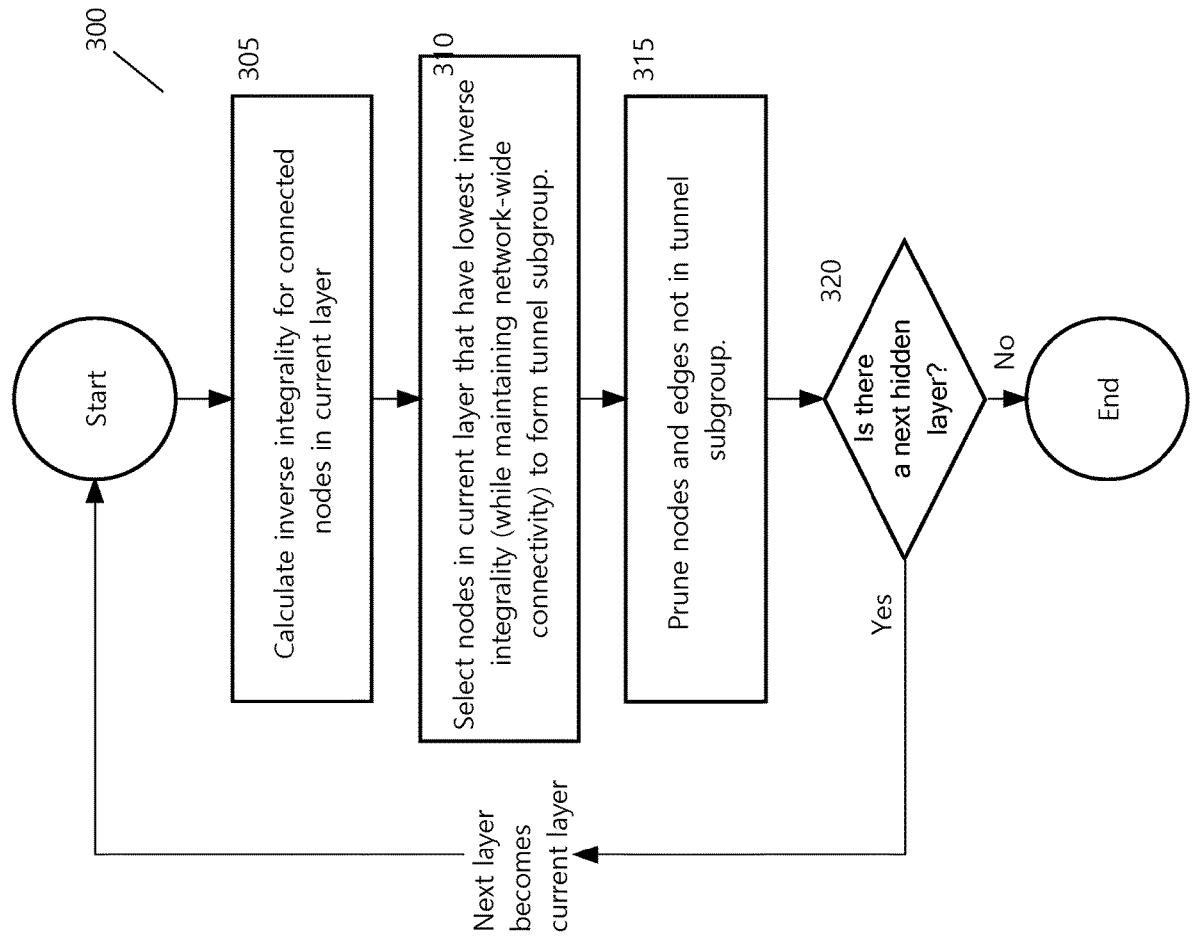
FIG. 3 depicts a procedure for generating a tunnel from an artificial neural network according to an embodiment of the present invention.

FIG. 3 is a flow chart depicting a procedure 300 for performing layered tunnel extraction. The procedure is illustrated using neural network 101 and tunnel 151 to form a tunnel with D=2.

At 305, the inverse integrality measures for connected neurons in the current layer is calculated. Initially, the current layer is the first hidden layer, hidden layer 1. All neurons in the hidden layer 1 are connected to one or more input neurons. Therefore, an inverse integrality measure is calculated for neurons G(1, 1) through G(1, 5).

At 310, D neurons with lowest inverse integrality measures are selected to form a tunnel subgroup for layer 1. The two neurons in layer 1 with the lowest inverse integrality are G(1,2) and G(1, 3). These three neurons are added to the tunnel subgroup for hidden layer 1.

At 315, neurons not in the tunnel group and the respective edges of the neurons are removed. In the current illustration, neuron G(1,1) and its edges IN(0,1)-G(1,1) and G(1,1)-G(2, 1) are removed. Similarly, neuron G(1,4) and G(1,5) and their edges are removed.

At 320, it is determined there is a next hidden layer, hidden layer 2. Therefore execution of the procedure proceeds to 305.

At 305, the inverse integrality measures for G(2,2), G(2, 3), and G(2,4) are calculated. Neuron G(2,1) may be ignored, as there is no longer an incoming edge because edge G(1,1)-G(2,1) had been removed.

At 310, it is determined that neurons G(2,2) and G(2,3) have the lowest inverse integrality measure. Therefore, these neurons are selected for the tunnel subgroup from hidden layer 2.

At 315, neurons G(2,1) and G(2,4) are removed form neural network 101, as well any edges to or from these neurons.

At 320, it is determined there is no next hidden layer. The tunnel formed is tunnel 151.

In an embodiment, pruning a neuron may violate network-wide connectivity. Network-level connectivity exists when there is path to every output neuron from at least one input neuron. Network-level connectivity is violated when there is not path to an output neuron from any input neuron. Thus, tunnel groups should be formed such that network-level connectivity is preserved.

Flatness

In the above tunnel extraction procedure, integrality is a factor that is used to prune neurons based on contribution to predictive accuracy. Another factor is flatness. A neuron or group of neurons that, for a set of observations, generates approximately the same output (subject to a predefined tolerance) is flat. A flat neuron or group may not contribute to predictive accuracy. Thus, according to an embodiment, a neuron is not selected for a tunnel subgroup when the neuron is flat.

According to an embodiment, to account for flatness, inverse integrality may be adjusted for flatness. Accordingly, an inverse integrality may be defined according to the following rule:

Given a tolerance tot (for instance, tol=$10^{-6}$)
If range(Y)<tol, then INVINT=Infinity
where range(Y)=max Y(n)−min Y(n) is the range of Y, the difference between its largest and smallest values.

Tunnel Merger

Tunnel merger generates a new neural network by combining tunnels, each from a different neural network. Once a new neural network has been formed, it may be trained.

Tunnel merger entails merging neurons in the hidden layers of the tunnel while retaining the edges and the respective weights of the edges and biases of the neurons in the hidden layers. Next, a threshold number of neurons with biases and a threshold number edges are added to the initial merger of tunnels. According to an embodiment, neurons are randomly added to each layer, and edges are added to the added neurons and to the neurons from the original tunnels. The value of biases and weights of the edges are randomly assigned from within a predetermined range. Performing tunnel merger on tunnels is referred to herein as merging the tunnels.

Figure 4A:
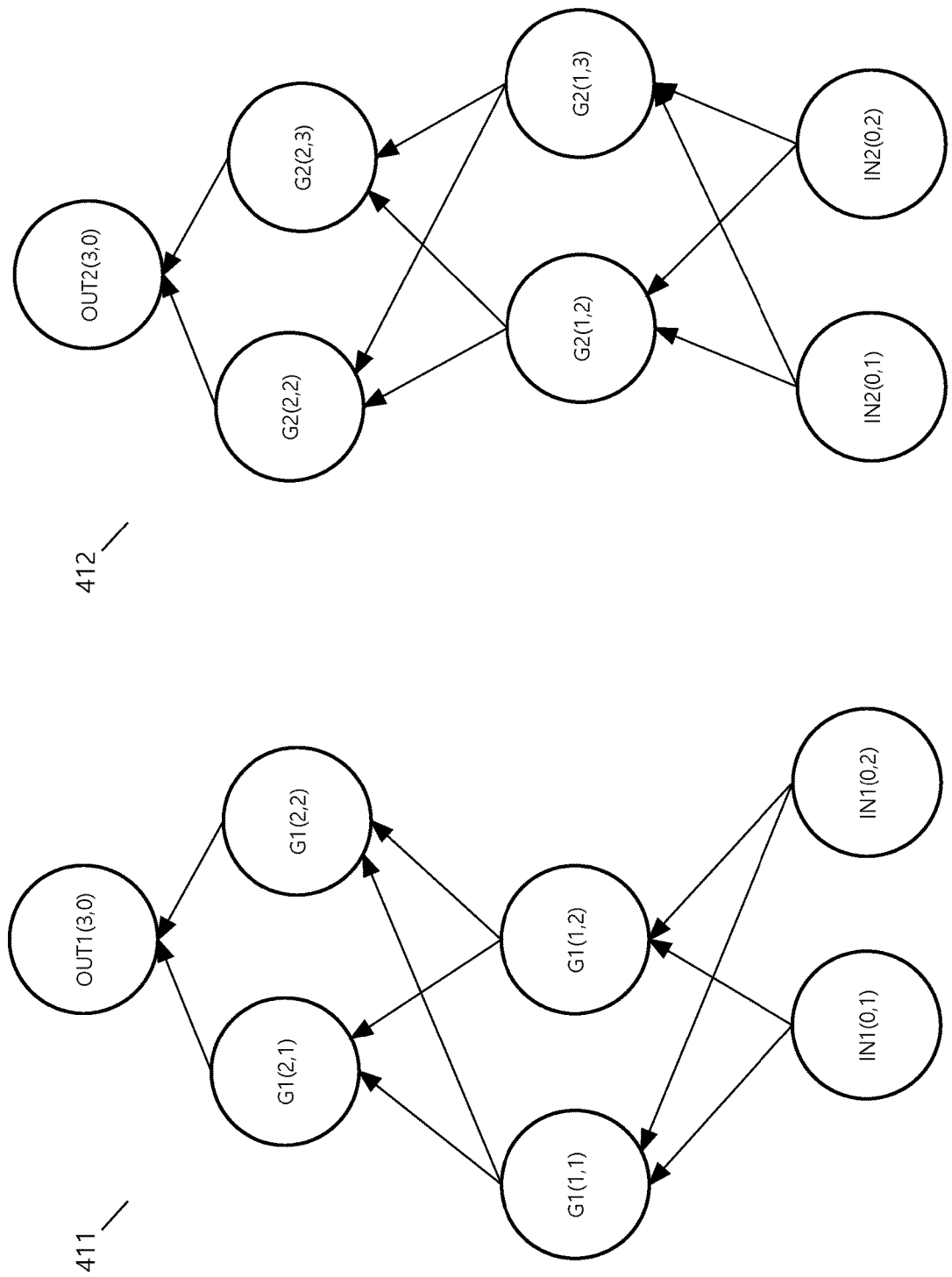
FIG. 4A depicts several tunnels according to an embodiment of the present invention.

Tunnel merger is illustrated using tunnels depicted in FIG. 4A. Referring to FIG. 4A, it depicts tunnel 411 and 412. Tunnel mergers generally involve tunnels having the same input neurons, output neurons, and the same number of hidden layers. For a given hidden layer, the number of neurons among the tunnels may vary. Tunnel 411 includes IN1(0,1), IN1(0,2) in the input layer, G1(1,1), G1(1,2) in the first hidden layer, G1(2,1) and G1(2,2) in the second hidden layer 2, and OUT1(3,0) in the output layer. Similarly, tunnel 412 includes IN2(0,1), IN2(0,2) in the input layer, G2(1,1), G2(1,2) in the first hidden layer, G2(2,1) and G2(2,2) in the second hidden layer 2, and OUT2(3,0) in the output layer.

Figure 4B:
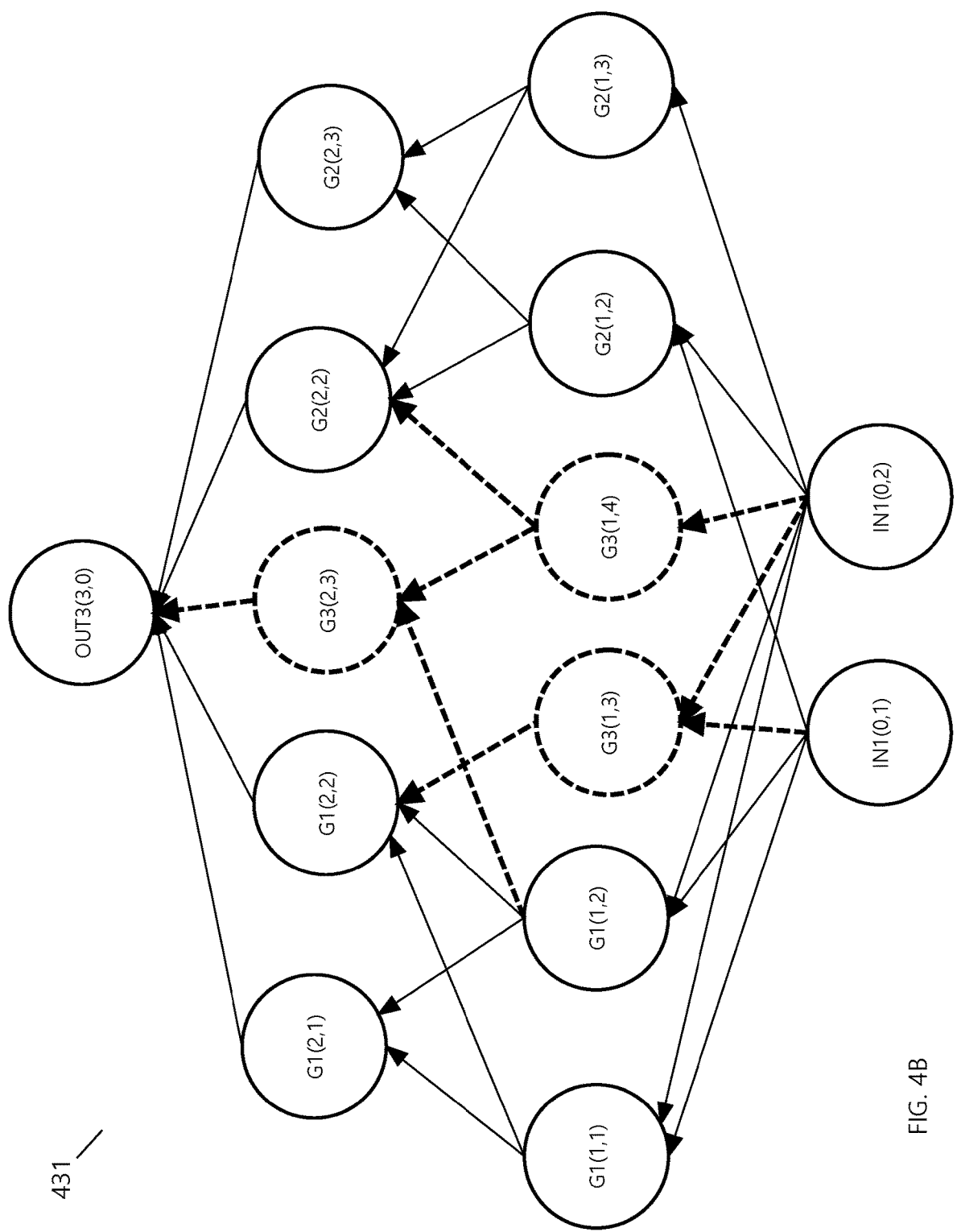
FIG. 4B depicts merger of the several tunnels according to an embodiment of the present invention.

FIG. 4B shows a neural network 431 after tunnel merger of tunnel 411 and tunnel 412. Neural network 431 includes neurons from tunnel 411 and tunnel 412 along with the original edges. The original weights and biases are retained. For purposes of describing merger, neurons from tunnel 411 and 412 are annotated in FIG. 4B with reference to the annotations used in FIG. 4A. Thus, neuron G1(1,1) and edge G1(1,1)-G1(2, 1) refer to same neuron and edge depicted in FIG. 4A.

Neurons have been randomly added to each layer of neural network 451. Neuron G3(1,3) and G3(1,4) have been added to the first layer of neural network 451, and G3(2,3) has been added to the second layer of neural network 451. Edges have been randomly assigned as well. For example, edge G3(1,4)-G3(2,3) and G3(1,4)-G2(2,2) have been added. An edge for G1(1,2)-G3(2,3), which is from merged tunnel 411, has also been added to neural network 451. Weights for the added edges and biases for the added neurons have been added with random values but are not depicted.

Tunnel-Based Pool Training

Tunnel-based pool training may be used to improve the predicative accuracy of one or more neural networks from an initial pool of pre-trained networks. The error of each of the pre-trained neural networks is known. In general, tunnels are extracted from each neural network and merged to form a new neural network. The new neural network is trained and its error rate is compared to those in the pool of networks. If the error of the new neural network is less than that of any neural network in the pool, the neural network with the worst error is replaced with the new neural network. These steps are performed a given number of times ("maximum iterations").

Figure 5:
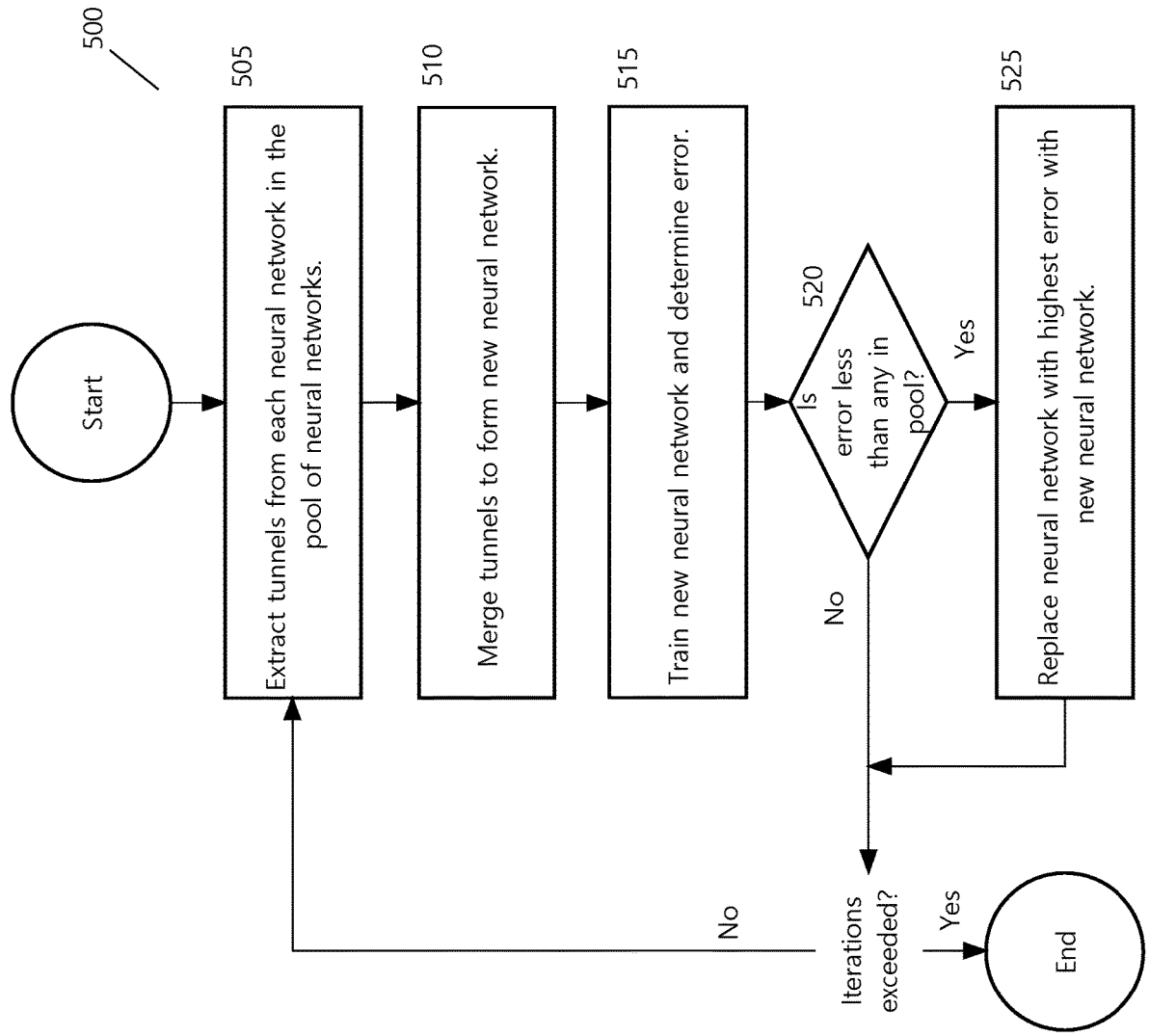
FIG. 5 depicts a procedure for forming an artificial neural network with greater predictive accuracy using tunnel merger according to an embodiment of the present invention.

FIG. 5 is a flow chart depicting a procedure for tunnel-based pool training. The procedure is performed for a given number of iterations on a pool of neural networks having a number of hidden layers, a number of input neurons, and a number of output neurons.

In the first iteration, at 505, tunnels are extracted from each neural network in the pool of neural networks. At 510, the tunnels are merged to form a new neural network. At 515, the new neural network is trained and its error determined.

At 520, it is determined whether the error of the new neural network is less than that of any of the neural networks in the pool of neural networks. If it is determined that the error of the new neural network is less than that of any of the neural network in the pool, then at 525, the neural network with the lowest error is removed and replaced with the new neural network.

If the number of the maximum number of iterations is exceeded, then execution of the procedure ceases. Otherwise, another iteration is performed beginning at 505.

According an embodiment, tunnels are extracted from each neural network pool and merged to form a new neural network that a smaller diameter D than other neural networks in the pool, thereby creating smaller neural networks that can be trained and executed more efficiently.

Machine Learning Models

A machine learning model is trained using a particular machine learning algorithm. Once trained, input is applied to the machine learning model to make a prediction, which may also be referred to herein as a predicated output or output.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the activation neuron is applied to the weighted input values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L-1 to a layer L. Given the number of neurons in layer L-1 and L is N[L-1] and N[L], respectively, the dimensions of matrix W is N[L-1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L-1 to L. An activation neuron represents an activation function for the layer that includes the activation function. An activation neuron in layer L corresponds to a row of weights in a matrix W for the edges between layer L and L-1 and a column of weights in matrix W for edges between layer L and L+1. During execution of a neural network, a neuron also corresponds to one or more activation values stored in a matrix A for the layer and generated by an activation function.

An ANN ("artificial neural network") is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake a I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptrons (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Autoencoder implementation and integration techniques are taught in related U.S. patent application Ser. No. 14/558,700, entitled "AUTO-ENCODER ENHANCED SELF-DIAGNOSTIC COMPONENTS FOR MODEL MONITORING". That patent application elevates a supervised or unsupervised ANN model as a first class object that is amenable to management techniques such as monitoring and governance during model development such as during training.

Deep Context Overview

As described above, an ANN may be stateless such that timing of activation is more or less irrelevant to ANN behavior. For example, recognizing a particular letter may occur in isolation and without context. More complicated classifications may be more or less dependent upon additional contextual information. For example, the information content (i.e. complexity) of a momentary input may be less than the information content of the surrounding context. Thus, semantics may occur based on context, such as a temporal sequence across inputs or an extended pattern (e.g. compound geometry) within an input example. Various techniques have emerged that make deep learning be contextual. One general strategy is contextual encoding, which packs a stimulus input and its context (i.e. surrounding/related details) into a same (e.g. densely) encoded unit that may be applied to an ANN for analysis. One form of contextual encoding is graph embedding, which constructs and prunes (i.e. limits the extent of) a logical graph of (e.g. temporally or semantically) related events or records. The graph embedding may be used as a contextual encoding and input stimulus to an ANN.

Hidden state (i.e. memory) is a powerful ANN enhancement for (especially temporal) sequence processing. Sequencing may facilitate prediction and operational anomaly detection, which can be important techniques. A recurrent neural network (RNN) is a stateful MLP that is arranged in topological steps that may operate more or less as stages of a processing pipeline. In a folded/rolled embodiment, all of the steps have identical connection weights and may share a single one dimensional weight vector for all steps. In a recursive embodiment, there is only one step that recycles some of its output back into the one step to recursively achieve sequencing. In an unrolled/unfolded embodiment, each step may have distinct connection weights. For example, the weights of each step may occur in a respective column of a two dimensional weight matrix.

A sequence of inputs may be simultaneously or sequentially applied to respective steps of an RNN to cause analysis of the whole sequence. For each input in the sequence, the RNN predicts a next sequential input based on all previous inputs in the sequence. An RNN may predict or otherwise output almost all of the input sequence already received and also a next sequential input not yet received. Prediction of a next input by itself may be valuable. Comparison of a predicted sequence to an actually received (and applied) sequence may facilitate anomaly detection. For example, an RNN based spelling model may predict that a U follows a Q while reading a word letter by letter. If a letter actually following the Q is not a U as expected, then an anomaly is detected.

Unlike a neural layer that is composed of individual neurons, each recurrence step of an RNN may be an MLP that is composed of cells, with each cell containing a few specially arranged neurons. An RNN cell operates as a unit of memory. An RNN cell may be implemented by a long short term memory (LSTM) cell. The way LSTM arranges neurons is different from how transistors are arranged in a flip flop, but a same theme of a few control gates that are specially arranged to be stateful is a goal shared by LSTM and digital logic. For example, a neural memory cell may have an input gate, an output gate, and a forget (i.e. reset) gate. Unlike a binary circuit, the input and output gates may conduct an (e.g. unit normalized) numeric value that is retained by the cell, also as a numeric value.

An RNN has two major internal enhancements over other MLPs. The first is localized memory cells such as LSTM, which involves microscopic details. The other is cross activation of recurrence steps, which is macroscopic (i.e. gross topology). Each step receives two inputs and outputs two outputs. One input is external activation from an item in an input sequence. The other input is an output of the adjacent previous step that may embed details from some or all previous steps, which achieves sequential history (i.e. temporal context). The other output is a predicted next item in the sequence. Example mathematical formulae and techniques for RNNs and LSTM are taught in related U.S. patent application Ser. No. 15/347,501, entitled "MEMORY CELL UNIT AND RECURRENT NEURAL NETWORK INCLUDING MULTIPLE MEMORY CELL UNITS."

Sophisticated analysis may be achieved by a so-called stack of MLPs. An example stack may sandwich an RNN between an upstream encoder ANN and a downstream decoder ANN, either or both of which may be an autoencoder. The stack may have fan-in and/or fan-out between MLPs. For example, an RNN may directly activate two downstream ANNs, such as an anomaly detector and an autodecoder. The autodecoder might be present only during model training for purposes such as visibility for monitoring training or in a feedback loop for unsupervised training. RNN model training may use backpropagation through time, which is a technique that may achieve higher accuracy for an RNN model than with ordinary backpropagation. Example mathematical formulae, pseudocode, and techniques for training RNN models using backpropagation through time are taught in related W.I.P.O. patent application No. PCT/US2017/033698, entitled "MEMORY-EFFICIENT BACKPROPAGATION THROUGH TIME".

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
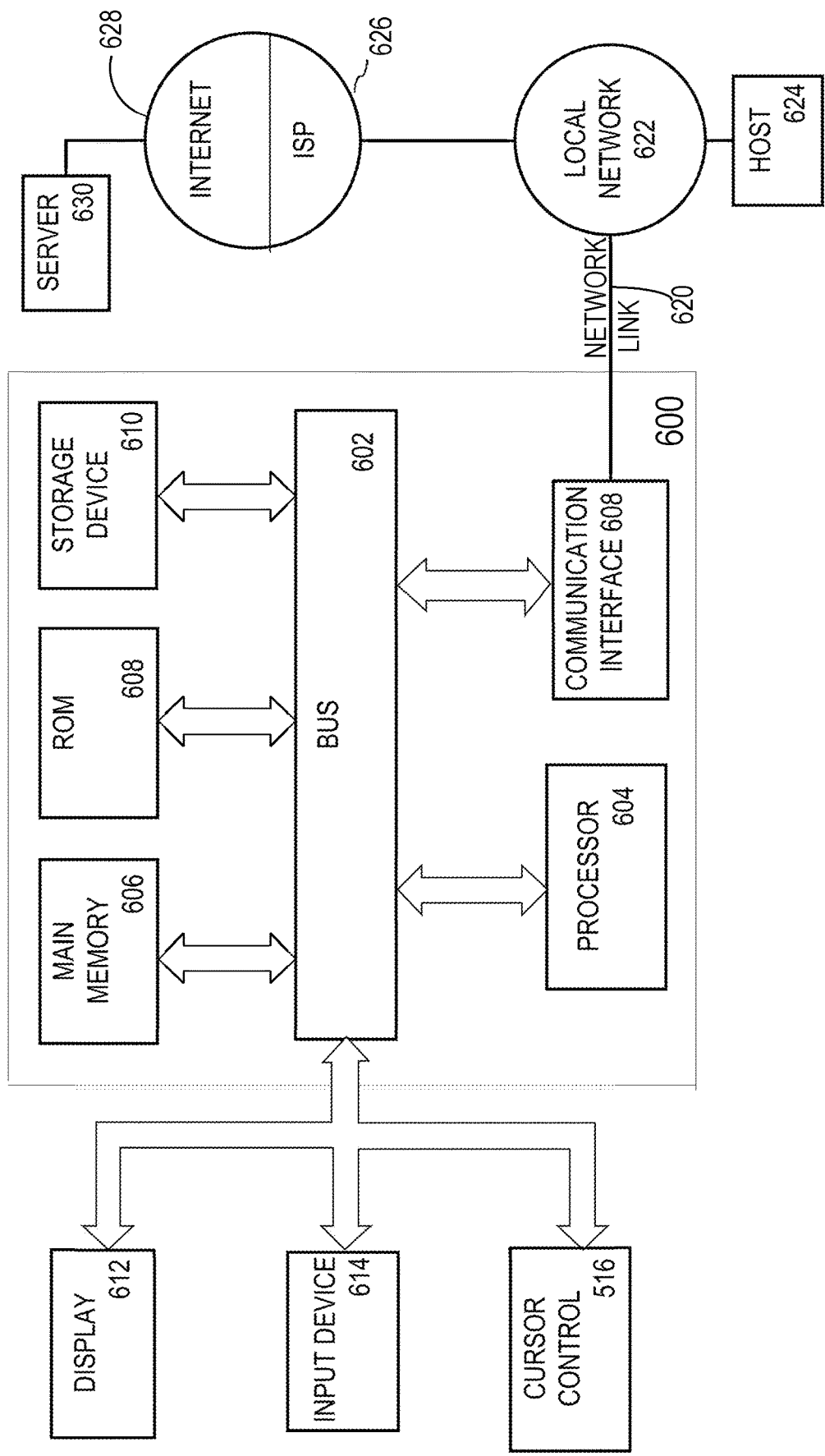
FIG. 6 is a diagram depicting a computer system that may be used to implement an embodiment of the present invention.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 7:
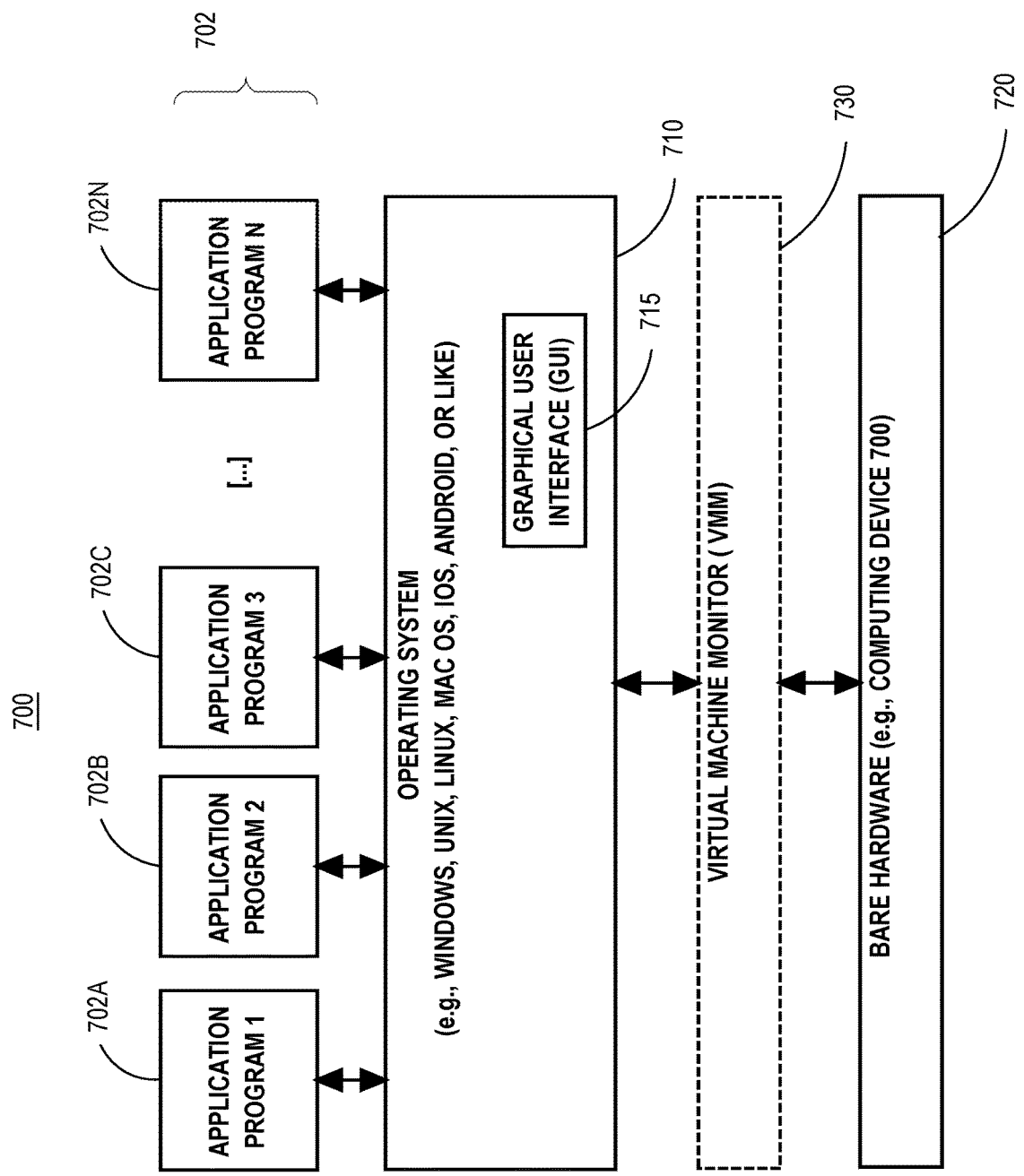
FIG. 7 depicts a software system that may be employed for controlling the operation of a computer system according to an embodiment of the present invention.

FIG. 7 is a block diagram of a basic software system 700 that may be employed for controlling the operation of computer system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computer system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

What is claimed is:

1. A method, comprising
   based on a set of inputs, generating each tunnel of a plurality of tunnels of neurons from a respective distinct artificial neural network of a plurality of artificial neural networks, wherein each particular neural network of said plurality of artificial neural networks comprises a plurality of input neurons, a plurality of hidden neurons, and one or more output neurons, wherein for each tunnel of said plurality of tunnels of neurons:
   said each tunnel includes all input neurons of one respective artificial neural network and all output neurons of the respective artificial neural network and less than all the plurality of hidden neurons of the respective artificial neural network;
   for each output neuron of said each tunnel, a path exists from at least one input neuron of said each tunnel to said each output neuron;
   wherein generating the plurality of tunnels includes for each tunnel of said plurality of tunnels of neurons, selecting for said each tunnel a portion of the plurality of hidden neurons of the respective distinct artificial neural network based on an integrality measure value calculated for each hidden neuron of said portion of the plurality of hidden neurons of the respective artificial neural network;
   wherein an integrality measure value calculated for any particular hidden neuron of said plurality of artificial neural networks indicates a degree to which said particular hidden neuron generates, for said set of inputs, outputs that are near a border of an output range for said particular hidden neuron;
   merging said plurality of tunnels to form a new artificial neural network that contains at least one hidden neuron of the plurality of hidden neurons of each artificial neural network of the plurality of artificial neural networks; and
   training said new artificial neural network.

2. The method of claim 1, wherein said plurality of tunnels includes a first tunnel that includes a first plurality of first hidden neurons from a first artificial neural network, wherein selecting for said each tunnel a portion of the plurality of hidden neurons of the respective artificial neural network includes:
   selecting a first group of said first plurality of first hidden neurons;
   removing edges from a second group of said first plurality of first hidden neurons pruned from said first tunnel; and
   after removing said edges from said second group, pruning from selection for said first tunnel one or more hidden neurons from said first plurality of first hidden neurons that no longer have incoming edges.

3. The method of claim 1, wherein said plurality of tunnels includes a first tunnel that includes a first plurality of first hidden neurons from a first artificial neural network, wherein selecting for said each tunnel a portion of the plurality of hidden neurons of the respective artificial neural network includes:
 making a determination that pruning a particular hidden neuron from said first plurality of first hidden neurons will leave a particular output neuron of said first tunnel with no path from an input neuron of said first tunnel to said particular output neuron; and
 in response to making said determination, retaining said particular hidden neuron in said first tunnel.

4. The method of claim 1, wherein merging said plurality of tunnels includes adding random edges with random weights between neurons of different tunnels of said plurality of tunnels.

5. The method of claim 1, further including, after training said new artificial neural network:
 generating an error rate for said new artificial neural network;
 making a determination that an error rate for said new artificial neural network is less than an error rate for a particular artificial neural network of said plurality of artificial neural networks.
 replacing said particular artificial neural network in said plurality of artificial neural networks with said new artificial neural network thereby forming a new plurality of artificial neural networks;
 forming an additional plurality of tunnels from said new plurality of artificial neural networks;
 merging said additional plurality of tunnels to form another new artificial neural network.

6. The method of claim 1, wherein each artificial neural network of said plurality of artificial neural networks is a layered artificial neural network.

7. The method of claim 6, wherein generating a plurality of tunnels includes for each tunnel of said plurality of tunnels of neurons includes selecting for said each tunnel a portion of a plurality of hidden neurons in a first layer of the respective artificial neural network based on an integrality measure value calculated for each neuron of said at least a portion of neurons in the first layer of the respective artificial neural network.

8. The method of claim 7, wherein generating a plurality of tunnels includes for each tunnel of said plurality of tunnels of neurons selecting for said each tunnel a portion of a plurality of hidden neurons in a second layer of the respective artificial neural network based on an integrality measure value calculated for each neuron of at least a portion of neurons in the second layer of the respective artificial neural network.

9. The method of claim 1, wherein an integrality measure value calculated for any particular hidden neuron is calculated according to a formula:

$$INT = 1 / \left(1 + \sum_{n=1}^{N} \min(|Y(n) - L|, |U - Y(n)|)\right)$$

wherein:
INT is the integrality measure value;
n is nth output for N observations; and
L and U define bounds of an activation function for said particular hidden neuron.

10. The method of claim 1, wherein the integrality measure value calculated for any particular hidden neuron is an inverse integrality measure value calculated according to a formula:

$$INVINT = \sum_{n=1}^{N} \min(|Y(n) - L|, |U - Y(n)|)$$

wherein:
INVINT is the inverse integrality measure value;
n is nth output for N observations; and
L and U define bounds of an activation function for said particular hidden neuron.

11. One or more non-transitory computer-readable media storing sequences of instructions which, when executed by one or more processors, cause:
 based on a set of inputs, generating each tunnel of a plurality of tunnels of neurons from a respective distinct artificial neural network of a plurality of artificial neural networks, wherein each particular neural network of said plurality of artificial neural networks comprises a plurality of input neurons, a plurality of hidden neurons, and one or more output neurons, wherein for each tunnel of said plurality of tunnels of neurons:
  said each tunnel includes all input neurons of one respective artificial neural network and all output neurons of the respective artificial neural network and less than all the plurality of hidden neurons of the respective artificial neural network;
  for each output neuron of said each tunnel, a path exists from at least one input neuron of said each tunnel to said each output neuron;
 wherein generating the plurality of tunnels includes for each tunnel of said plurality of tunnels of neurons, selecting for said each tunnel a portion of the plurality of hidden neurons of the respective distinct artificial neural network based on an integrality measure value calculated for each hidden neuron of said portion of the plurality of hidden neurons of the respective artificial neural network;
 wherein an integrality measure value calculated for any particular hidden neuron of said plurality of artificial neural networks indicates a degree to which said particular hidden neuron generates, for said set of inputs, outputs that are near a border of an output range for said particular hidden neuron;
 merging said plurality of tunnels to form a new artificial neural network that contains at least one hidden neuron of the plurality of hidden neurons of each artificial neural network of the plurality of artificial neural networks; and
 training said new artificial neural network.

12. The one or more non-transitory computer-readable media of claim 11, wherein said plurality of tunnels includes a first tunnel that includes a first plurality of first hidden neurons from a first artificial neural network, wherein selecting for said each tunnel a portion of the plurality of hidden neurons of the respective artificial neural network includes:
 selecting a first group of said first plurality of first hidden neurons;
 removing edges from a second group of said first plurality of first hidden neurons pruned from said first tunnel; and after removing said edges from said second group, pruning from selection for said first tunnel one or more hidden neurons from said first plurality of first hidden neurons that no longer have incoming edges.

13. The one or more non-transitory computer-readable media of claim 11, wherein said plurality of tunnels includes a first tunnel that includes a first plurality of first hidden neurons from a first artificial neural network, wherein selecting for said each tunnel a portion of the plurality of hidden neurons of the respective artificial neural network includes:
   making a determination that pruning a particular hidden neuron from said first plurality of first hidden neurons will leave a particular output neuron of said first tunnel with no path from an input neuron of said first tunnel to said particular output neuron; and
   in response to making said determination, retaining said particular hidden neuron in said first tunnel.

14. The one or more non-transitory computer-readable media of claim 11, wherein merging said plurality of tunnels includes adding random edges with random weights between neurons of different tunnels of said plurality of tunnels.

15. The one or more non-transitory computer-readable media of claim 11, wherein said sequences of instructions include instructions which, when executed by said one or more processors, cause, after training said new artificial neural network:
   generating an error rate for said new artificial neural network;
   making a determination that an error rate for said new artificial neural network is less than an error rate for a particular artificial neural network of said plurality of artificial neural networks.
   replacing said particular artificial neural network in said plurality of artificial neural networks with said new artificial neural network thereby forming a new plurality of artificial neural networks;
   forming an additional plurality of tunnels from said new plurality of artificial neural networks;
   merging said additional plurality of tunnels to form another new artificial neural network.

16. The one or more non-transitory computer-readable media of claim 11, wherein each artificial neural network of said plurality of artificial neural networks is a layered artificial neural network.

17. The one or more non-transitory computer-readable media of claim 16, wherein generating a plurality of tunnels includes for each tunnel of said plurality of tunnels of neurons includes selecting for said each tunnel a portion of a plurality of hidden neurons in a first layer of the respective artificial neural network based on an integrality measure value calculated for each neuron of said at least a portion of neurons in the first layer of the respective artificial neural network.

18. The one or more non-transitory computer-readable media of claim 17, wherein generating a plurality of tunnels includes for each tunnel of said plurality of tunnels of neurons selecting for said each tunnel a portion of a plurality of hidden neurons in a second layer of the respective artificial neural network based on an integrality measure value calculated for each neuron of at least a portion of neurons in the second layer of the respective artificial neural network.

19. The one or more non-transitory computer-readable media of claim 11, wherein an integrality measure value calculated for any particular hidden neuron is calculated according to a formula:

$$INT = 1 / \left( 1 + \sum_{n=1}^{N} \min(|Y(n) - L|, |U - Y(n)|) \right)$$

wherein:
INT is the integrality measure value;
n is nth output for N observations; and
L and U define bounds of an activation function for said particular hidden neuron.

20. The one or more non-transitory computer-readable media of claim 11, wherein the integrality measure value calculated for any particular hidden neuron is an inverse integrality measure value calculated according to a formula:

$$INVINT = \sum_{n=1}^{N} \min(|Y(n) - L|, |U - Y(n)|)$$

wherein:
INVINT is the inverse integrality measure value;
n is nth output for N observations; and
L and U define bounds of an activation function for said particular hidden neuron.

\* \* \* \* \*